Oct. 3, 1950  D. A. CAMPBELL ET AL  2,524,559
ENTRAINMENT DEVICE
Filed Aug. 16, 1947  2 Sheets-Sheet 1
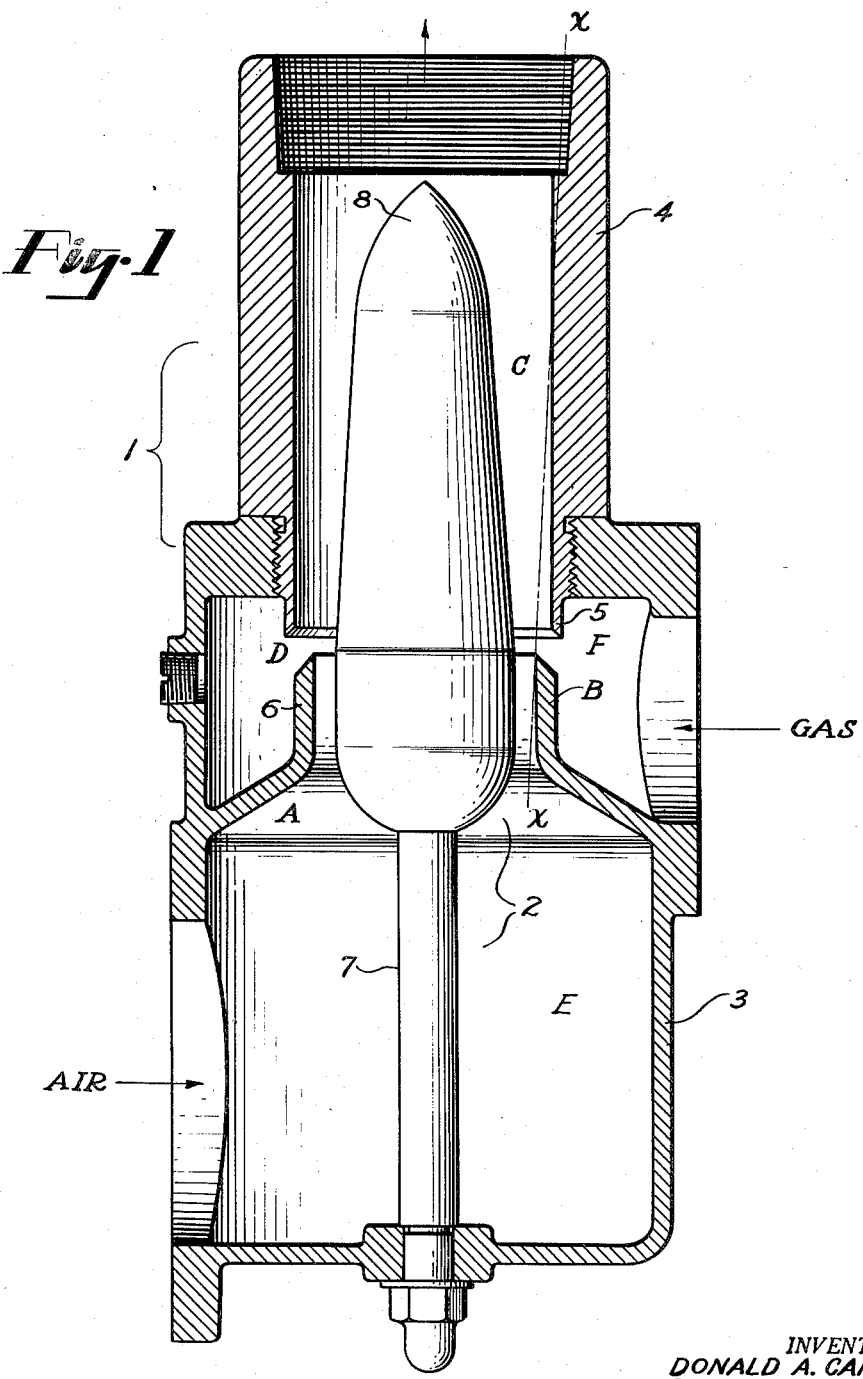
INVENTORS.
DONALD A. CAMPBELL
ROBERT M. BUCK
BY
Frank R. Higley
ATTORNEY

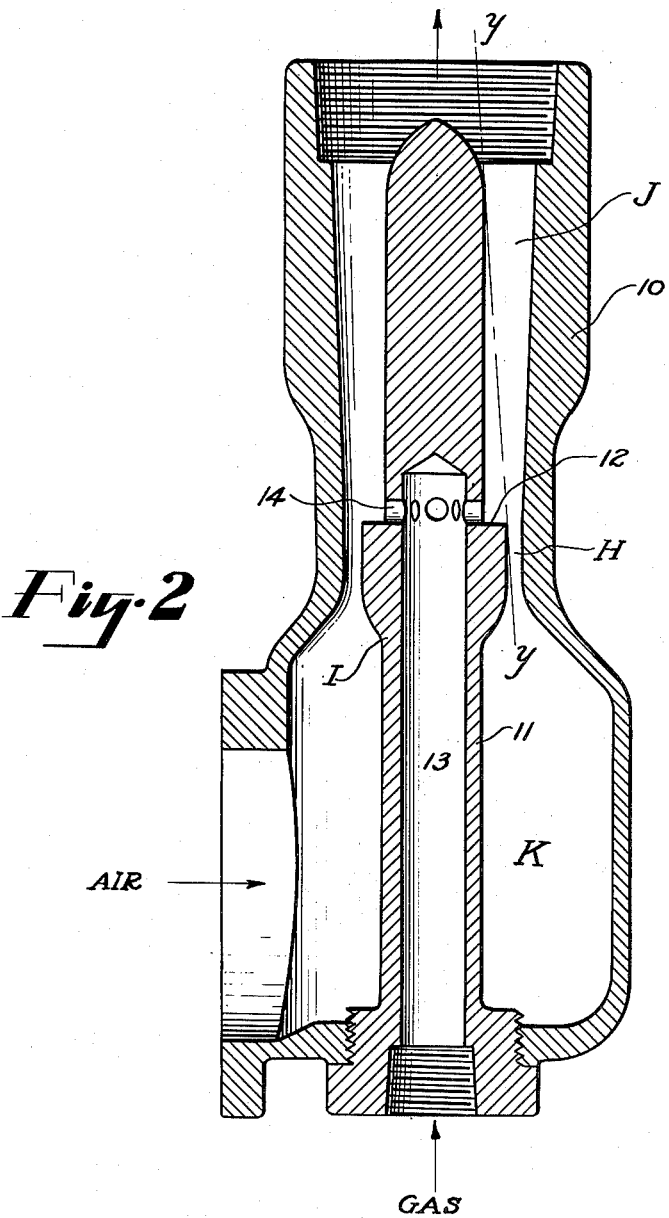

Patented Oct. 3, 1950

2,524,559

UNITED STATES PATENT OFFICE 2,524,559

ENTRAINMENT DEVICE

Donald A. Campbell and Robert M. Buck, Cleveland, Ohio, assignors, by mesne assignments, to Affiliated Gas Equipment, Inc., Cleveland, Ohio, a corporation of Delaware Application August 16, 1947, Serial No. 768,956

10 Claims. (Cl. 230—95)

This invention relates to entrainment devices of the class employed for entrainment of a predetermined fixed proportional amount of fuel gas in a stream of air for combustion, under pressure, for service of an industrial burner, the device functioning to mix the air and the entrained gas, as well as convert a large part of the velocity energy of the air into pressure energy of the mixture.

The principal object of the invention is to provide such a device of much smaller size and particularly length, for its capacity, than has heretofore been possible in the art.

Most prior devices of the type contemplated employ certain principles of the Venturi tube; and as will more particularly appear hereinafter, the device of this invention employs the same principles, but in a form which provides flow of a hollow stream such as an annular one, rather than the usual solid stream.

This invention preferably employs also, principles set forth in Patent No. 2,493,387 issued January 3, 1950, to Donald A. Campbell, as will hereinafter appear.

Further objects and advantages will be apparent from the following description taken in connection with the accompanying drawings, both of which are views in longitudinal section of embodiments of the invention;

Fig. 1 being a preferred embodiment and

Fig. 2 a modification thereof.

With reference now to the drawings and first to Fig. 1 thereof, principal parts of the device are a pair of members coaxially disposed, one about the other, and generally indicated as 1 and 2 respectively, for cooperation to define a passage therebetween.

Preferably, as for manufacturing reasons, the two coaxially disposed members are generally cylindrical so that the passage is annular in typical transverse section; but it will be understood that the two members might have other forms in transverse section within the spirit of the invention; for simplicity, however, the term "annular," and corresponding terms such as "cylindrical" and "conical" being hereinafter employed.

The members 1 and 2 are formed so that the passage includes a relatively restricted orifice or throat portion B of considerable length, and a divergent mixing portion C leading therefrom, and preferably a convergent approach A to the throat B. In the embodiment of Fig. 1, both members are cylindrical at the throat portion B and both have taper at the approach portion A, but at the mixing portion C the outer member 1 is cylindrical and the inner member 2 tapering to provide passageway divergence.

The outer, cylindrical, member 1 is stepped adjacent the downstream end or mouth of the throat portion B to there abruptly and substantially enlarge the passage end, and there has an opening D for lateral entry of fluid into the passage adjacent such enlargement thereof; the opening D, by the arrangement here illustrated, being annular without interruption.

The relative diameters of the two members adjacent the opening D are such that the abrupt passageway enlargement at the mouth of its throat portion is approximately 100%. That is, the sectional area of the passageway immediately downstream of the mouth is twice that of the sectional area of its orifice or throat portion B upstream of the mouth.

The outer member 1 includes an upstream body part 3, and a downstream part 4 turned thereinto, the latter containing a cylindrical bore defining the outer periphery of the divergent mixing portion C of the passageway, with an upstream extension 5 providing one boundary of the opening D.

The part 3 is generally hollow, having a partition wall 6 dividing its interior into a pair of chambers E and F, and also defining the outer peripheral extremities of the convergent portion A and the throat portion B of the passage, and the upstream boundary of the opening D.

The body part 3 has lateral openings as illustrated for gas inlet connection to the chamber F and air inlet connection to the chamber E, its upstream end being closed.

The inner member 2 includes a stem portion 7 by which it is rigidly and concentrically mounted in the end wall of the part 3, its downstream extremity 8 having a gradually terminating contour within the part 4, the outlet end of which latter may be threaded as indicated for connection to the burner to be served by the device.

In operation, air under pressure being supplied to the chamber E, and the chamber F having connection with a gas supply suitably governed to maintain zero pressure, the stream of air flowing through the annular passage, and attaining maximum velocity at the throat portion B thereof from which it emerges as from a nozzle orifice, will effect a vacuum adjacent its outer periphery immediately downstream of the opening D, so that gas flow will be induced inwardly through the opening D; and gas will be entrained into and intermix with the air stream, in and along the divergent mixing portion C of the passageway of which portion, however, one of its boundary walls is continuously cylindrical. Thus a mixture of gas and air for its combustion will emerge from the device.

The gas supply being maintained at zero and the area of the gas annular slot D kept constant, the amount of gas entrained will be found to vary directly with the amount of air flow, which in turn is dependent on air pressure. Any additional resistance to flow between the zero gas source and the gas opening D will reduce the gas entrainment, but once set, the gas-to-air ratio will remain constant, so that a fixed proportion of air to gas will emerge, regardless of the rate of mixture delivery.

The taper of the inner member 2 follows the natural expansion of the annular air stream from the throat portion B at the inner surface of the stream, whereby much of the kinetic energy of the stream is converted to pressure energy in the mixture emerging from the device.

With reference now to the modification of Fig. 2, a cooperative pair of members generally indicated at 10 and 11 are coaxially disposed, one about the other respectively, to define therebetween an annular passage.

As before, the members are so formed that the passage is annular in typical transverse section, with a cylindrical throat portion H, a convergent portion I leading thereto, and a relatively long divergent portion J leading therefrom.

Also as before, the passageway has abrupt enlargement immediately downstream of its throat portion H; but here the enlargement is provided by stepping of the inner member 11, as at 12, this member being of cylindrical form thence downstream, but having a gradually contoured termination within the outer member 10 adjacent the outlet opening of the latter. The outer member 10 downstream of the throat H, has a conical bore providing the divergence of the passageway mixing portion J.

The inner member 11 is mounted in the end of the outer member 10 as by the threaded connection indicated, and is drilled out as longitudinally at 13 and transversely at 14, for induction of gas to be entrained into the main stream at the passageway enlargement immediately downstream of the step 12.

The outer member 10 is enlarged about the stem portion of the inner member to there provide a chamber K, and has lateral air inlet opening thereto as indicated in the drawing.

Operation will be generally as before, with gas supplied at zero pressure being entrained in the air stream provided at higher pressure, proportioning of the resultant mixture emerging from the device being maintained independent of the quantities, and with a large capacity characteristic for the length of the device; the gas, however, entering the air stream in a radially outward direction instead of the radially inward direction as in the previously disclosed embodiment.

As to both specifically illustrated forms of the invention, line x—x, Fig. 1 and line y—y, Fig. 2 indicate approximately the divergence angle of the free surface of the expanding air stream— this being, in Fig. 1 on the outside and Fig. 2 on the inside, and thus in each form on the cylindrical wall side of the passage.

The arrangement provides an annular space, the pressure within which the entraining air stream maintains below atmosphere, and which space extends a substantial distance lengthwise of the passage downstream of the throat, bounded on one side by cylindrical wall and on the other side by free surface of the expanding air stream. Certain principles of such arrangement are more fully set forth in the above identified patent.

Furthermore as to this invention, however, the entraining air stream is itself annular, so that the area of its free surface is very large compared with the capacity of the throat, and hence entrainment is accomplished in a relatively short distance lengthwise of the passage.

Notably, the taper of the non-cylindrical wall side of the passage, leading from the throat, is such as to match the natural expansion of the air stream. The tapered wall itself, therefore, extends downstream at least to a location opposite that at which the expanding air stream meets the cylindrical wall. Downstream of such location the inner of the two principal members, as the member 8 in Fig. 1 and the member 11 of Fig. 2, is terminated with a curved sectional contour to there convert remaining velocity energy into static energy so far as possible.

While in both illustrated forms of this invention, the step by which abrupt enlargement of the passage is had at the downstream end of the throat portion thereof, is herein illustrated as effectively of 90° angularity in section, it will be appreciated that such sharp abruptness is not essential to the invention. For example, 45° angles might be employed at the step where 90° angles have been illustrated.

What is claimed is:

1. In an entrainment device for the purpose described: a pair of members, coaxially disposed one about the other, to cooperatively define therebetween a through annular passage including a cylindrical orifice portion and an entrainment portion of substantial length into which said orifice portion discharges, one of said members being stepped adjacent the mouth of said orifice portion to there abruptly enlarge the sectional area of said passage, having an opening leading into said mixing portion adjacent said mouth, and being continuously cylindrical from said opening throughout said entrainment portion, said device including connection means providing for discharge of entraining fluid through said orifice portion, and for introduction of fluid to be entrained, at said opening.

2. In an entrainment device for the purpose described: a pair of members, coaxially disposed one about the other, to cooperatively define therebetween a through annular passage including a cylindrical orifice portion and an entrainment portion of substantial length into which said orifice portion discharges, one of said members being stepped adjacent the mouth of said orifice portion to there abruptly enlarge the sectional area of said passage, having an opening leading into said mixing portion adjacent said mouth, and being continuously cylindrical from said opening throughout said entrainment portion, the other of said members being tapered downstream from said orifice to provide divergence of said passage throughout said entrainment portion, said device including connection means providing for discharge of entraining fluid through said orifice portion, and for introduction of fluid to be entrained, at said opening.

3. In an entrainment device for the purpose described; a pair of members, coaxially disposed one about the other, to cooperatively define therebetween a through annular passage including a cylindrical orifice portion and an entrainment portion of substantial length into which said orifice portion discharges, one of said members being stepped adjacent the mouth of said orifice portion to there abruptly enlarge the sectional area of said passage, having an opening leading into said mixing portion adjacent said mouth, and being continuously cylindrical from said opening throughout said entrainment portion, the other of said members being tapered downstream from said orifice to provide divergence of said passage throughout said entrainment portion, the taper of said other member matching the natural expansion of a jet emerging from said orifice, said device including connection means providing for discharge of entraining fluid through said orifice portion, and for introduction of fluid to be entrained, at said opening.

4. In an entrainment device for the purpose described: a pair of members, coaxially disposed one about the other, to cooperatively define therebetween a through annular passage including a cylindrical orifice portion and an entrainment portion of substantial length into which said orifice portion discharges, one of said members being stepped adjacent the mouth of said orifice portion to there abruptly double the sectional area of said passage, having an opening leading into said mixing portion adjacent said mouth, and being continuously cylindrical from said opening throughout said entrainment portion, said device including connection means providing for discharge of entraining fluid through said orifice portion, and for introduction of fluid to be entrained, at said opening.

5. In an entrainment device for the purpose described: a pair of members, coaxially disposed one about the other, to cooperatively define therebetween a through annular passage including a cylindrical orifice portion and an entrainment portion of substantial length into which said orifice portion discharges, one of said members being stepped adjacent the mouth of said orifice portion to there abruptly double the sectional area of said passage, having an opening leading into said mixing portion adjacent said mouth, and being continuously cylindrical from said opening throughout said entrainment portion, the other of said members being tapered downstream from said orifice to provide divergence of said passage throughout said entrainment portion, said device including connection means providing for discharge of entraining fluid through said orifice portion, and for introduction of fluid to be entrained, at said opening.

6. In an entrainment device for the purpose described: a pair of members, coaxially disposed one about the other, to cooperatively define therebetween a through annular passage including a cylindrical orifice portion and an entrainment portion of substantial length into which said orifice portion discharges, one of said members being stepped adjacent the mouth of said orifice portion to there abruptly double the sectional area of said passage, having an opening leading into said mixing portion adjacent said mouth, and being continuously cylindrical from said opening throughout said entrainment portion, the other of said members being tapered downstream from said orifice to provide divergence of said passage throughout said entrainment portion, the taper of said other member matching the natural expansion of a jet emerging from said orifice, said device including connection means providing for discharge of entraining fluid through said orifice portion, and for introduction of fluid to be entrained, at said opening.

7. In an entrainment device for the purpose described: a pair of members, coaxially disposed one about the other, to cooperatively define therebetween a through annular passage including a cylindrical orifice portion and an entrainment portion of substantial length into which said orifice portion discharges, the outer of said members being stepped adjacent the mouth of said orifice portion to there abruptly enlarge the sectional area of said passage, having an opening leading into said mixing portion adjacent said mouth, and being continuously cylindrical from said opening throughout said entrainment portion, said device including connection means providing for discharge of entraining fluid through said orifice portion, and for introduction of fluid to be entrained, at said opening.

8. In an entrainment device for the purpose described: a pair of members, coaxially disposed one about the other, to cooperatively define therebetween a through annular passage including a cylindrical orifice portion and an entrainment portion of substantial length into which said orifice portion discharges, the outer of said members being stepped adjacent the mouth of said orifice portion to there abruptly enlarge the sectional area of said passage, having an opening leading into said mixing portion adjacent said mouth, and being continuously cylindrical from said opening throughout said entrainment portion, the inner of said members being convergently tapered downstream from said orifice to provide divergence of said passage throughout said entrainment portion, said device including connection means providing for discharge of entraining fluid through said orifice portion, and for introduction of fluid to be entrained, at said opening.

9. In an entrainment device for the purpose described: a pair of members, coaxially disposed one about the other, to cooperatively define therebetween a through annular passage including a cylindrical orifice portion and an entrainment portion of substantial length into which said orifice portion discharges, the outer of said members being stepped adjacent the mouth of said orifice portion to there abruptly enlarge the sectional area of said passage, having an opening leading into said mixing portion adjacent said mouth, and being continuously cylindrical from said opening throughout said entrainment portion, the inner of said members being convergently tapered downstream from said orifice to provide divergence of said passage throughout said entrainment portion, the taper of said inner member matching the natural expansion of a jet emerging from said orifice, said device including connection means providing for discharge of entraining fluid through said orifice portion, and for introduction of fluid to be entrained, at said opening.

10. In an entrainment device for the purpose described: a pair of members, coaxially disposed one about the other, to cooperatively define therebetween a through annular passage including a cylindrical orifice portion and an entrainment portion of substantial length into which said orifice portion discharges, one of said members being stepped adjacent the mouth of said orifice portion to there abruptly enlarge the sectional area of said passage, having an opening leading into said mixing portion adjacent said mouth, and being continuously cylindrical from said opening throughout said entrainment portion, the other of said members being tapered downstream from said orifice to provide divergence of said passage throughout said entrainment portion, the taper of said other member matching the natural expansion of a jet emerging from said orifice, said device including connection means providing for discharge of entraining fluid through said orifice portion, and for introduction of fluid to be entrained, at said opening, said entrainment portion extending downstream to the location at which said jet will engage said cylindrical member.

DONALD A. CAMPBELL.
ROBERT M. BUCK.

REFERENCES CITED

The following references are of record in the file of this patent:

UNITED STATES PATENTS

| Number | Name | Date |
|---|---|---|
| 1,413,733 | Higgins et al. | Apr. 25, 1922 |
| 1,835,603 | Kincaid | Dec. 8, 1931 |
| 1,845,969 | Hueber | Feb. 16, 1932 |
| 1,982,128 | Ventrano | Nov. 27, 1934 |
| 1,987,883 | White et al. | Jan. 15, 1935 |
| 2,172,522 | Sline | Sept. 12, 1939 |
| 2,180,259 | Sargent | Nov. 14, 1939 |
| 2,183,623 | Ross | Dec. 19, 1939 |
| 2,228,171 | Lutherer et al. | Jan. 7, 1941 |
| 2,240,119 | Montgomery et al. | Apr. 29, 1941 |
| 2,283,907 | Berman | May 26, 1942 |
| 2,493,387 | Campbell | Jan. 3, 1950 |

FOREIGN PATENTS

| Number | Country | Date |
|---|---|---|
| 13,548 | Great Britain | 1912 |
| 28,590 | France | 1912 |